J. ENOS, dec'd., W. GRAY, Adm'r.

Said ENOS assignor by mesne assignments to the ENOS CAR COUPLING CO.

CAR-COUPLING.

No. 7,515. Reissued Feb. 20, 1877.

William Gray
Administrator of
Joab Enos
Inventor
By Coburn & Parker
Attorneys.

Attest
W. S. Baker
L. A. Bunting

N. PETERS, PHOTO-LITHOGRAPHER, WASHINGTON, D. C.

UNITED STATES PATENT OFFICE.

WILLIAM GRAY, OF DAVENPORT, IOWA, ADMINISTRATOR OF JOAB ENOS, DECEASED; SAID ENOS ASSIGNOR, BY MESNE ASSIGNMENTS, TO THE ENOS CAR COUPLING COMPANY, OF CHICAGO, ILLINOIS.

IMPROVEMENT IN CAR-COUPLINGS.

Specification forming part of Letters Patent No. 150,309, dated April 28, 1874; reissue No. 7,515, dated February 20, 1877; application filed May 15, 1876.

*To all whom it may concern:*

Be it known that JOAB ENOS, of St. Joseph, in the county of Berrien and State of Michigan, did invent certain new and useful Improvements in Car-Couplings, which is fully described in the following specification, reference being had to the accompanying drawings, in which—

Figure 1:
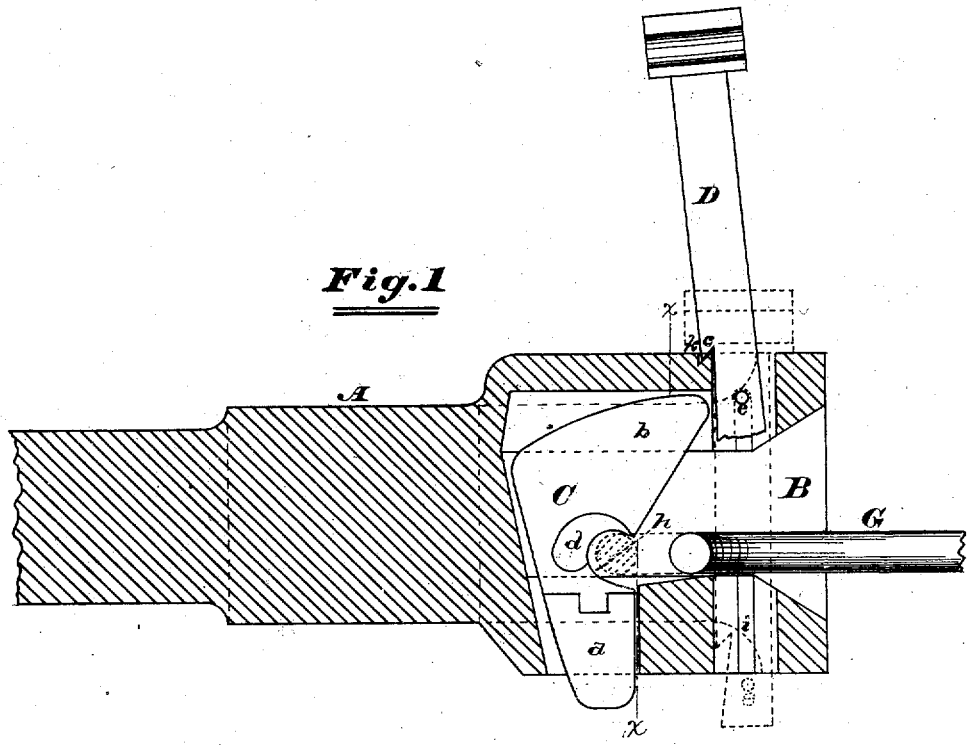
Figure 3:
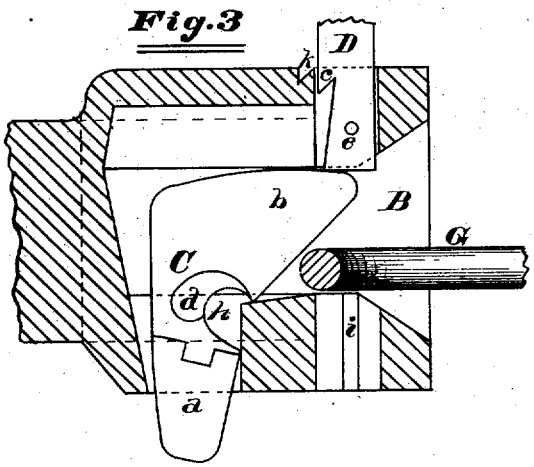
Figure 2:
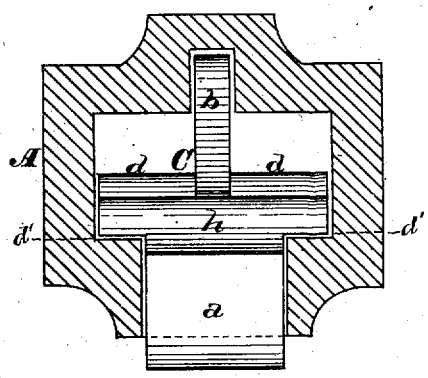

Figure 1 is a longitudinal vertical section of this car-coupler. Fig. 2 is a transverse vertical section taken at the line *x x* in Fig. 1. Fig. 3 is a longitudinal vertical section, showing the pin resting on the toggle, ready to be coupled.

This invention consists in the special construction of the toggle, whereby it has projections or supporting-flanges, upon which it is suspended, and a link-holding projection, and so formed as to balance upon the projections to hold the link, as hereinafter specified; also, in the construction of the draw-head, so that it is provided with a chamber which has a shoulder or shoulders upon which the projections on the toggle can rest and vibrate, for the purposes hereinafter specified.

In the drawings, A represents the bumper or draw-head, provided with the usual flaring mouth, B, and an interior chamber. Inside of this chamber is placed a toggle, C, constructed, as shown in the drawing, with a heavy lower end, *a*, which passes down through a beveled or inclined aperture in the bottom of the draw-head. The upper end *b* of the toggle is somewhat in the shape of a hook-bill; and on the sides of the toggle are arms *d d*, to rest on shoulders within the draw-head. The front side of the toggle, at and below the arms, is rounded in concave form, as shown in Fig. 1, thus forming a pocket, *h*, for the link G, which may rise and fall, to accommodate itself to the motion of the link when the cars are in motion, as the toggle has no pivot at all, and free to rise and fall while being held in an upright position by the weighted portion *a* in the lower portion of the draw-head. D represents the coupling-pin, which is made square, with a suitable head, to prevent it falling through the draw-head. Through the lower end of the pin D passes a small transverse pin, *e*, which fits in grooves *i*, made in the sides of the holes in the draw-head. In the upper part of the draw-head these grooves do not extend clear to the top, but from stops for the pin *e*, so as to prevent the coupling-pin from being entirely withdrawn from the draw-head, and thus lessen the liability of losing the same. G represents the ordinary coupling-link.

When the link is withdrawn and the coupling-pin D raised to a proper height, the toggle will drop forward, so that the point of the hook-bill *b* will be under the lower end of the coupling-pin, which may thus rest on the same. As the link G enters the draw-head it strikes the toggles on the under side of the arms *d d*, forcing the toggle backward and upward. The backward movement releases the coupling-pin D, which will then drop down and couple the coupling. The upward movement allows the inner end of the link to enter the concavity in the toggle. The toggle will then hold the link in a horizontal position, and at the same time allow the link to move freely in any direction, if necessary.

On the side of the coupling-pin D is formed a hook, *c*, to catch in a notch, *k*, on the upper surface of the draw-head, to support the pin when the cars are uncoupled and not ready to be coupled. When the cars are to be coupled the pin is simply lifted off, when it will rest on the toggle, as above described.

The shoulders *d'*, on which the projections of the toggle rest, are made relative to the chamber and recesses in the draw-head, so that the toggle hangs suspended on said shoulders, and will vibrate thereon, to admit of the coupling of the car and holding the link, as above specified.

It is well known that toggles have been used pivoted to the draw-head; also, made slotted and held in position by a transverse pin, and, also, the bottom of the toggle slotted or made open on the bottom, and resting upon a pin. The devices shown in Patent No. 95,652 are known, and such are not, therefore, claimed, the objects of this invention being to dispense with the pin and simplify the construction.

Having thus fully described this invention, what is claimed as new, and desired to have secured by Letters Patent, is—

1. The combination of the draw-head A, having shoulders within a chamber, which constitute the bearing-surfaces for the support of the toggle, and the toggle C, provided with arms or flanges *d*, by which it is supported, and on which it vibrates, substantially as described.

2. The draw-head A, having a chamber provided with shoulders *d'*, for supporting the toggle, and recesses, so that the toggle can vibrate on said shoulders, substantially as specified.

3. The combination of the draw-head A, having an ordinary flaring mouth, B, loose toggle C, constructed as described, with supporting-flanges *d*, concavity *h*, and weighted ends *a b*, and coupling-link G, whereby the link may be held in a horizontal position by the toggle, but at the same time may be moved in any direction desired, to facilitate the coupling of the cars together, substantially as set forth.

WILLIAM GRAY,
*Administrator of Joab Enos, deceased.*

Witnesses:
WM. A. GRAY,
O. L. SACKSON.